April 23, 1968 M. LEROY 3,379,881

DEVICE FOR THE REPRESENTATION IN DIFFERENT COLORS OF DIFFERENT RADIATION INTENSITIES EMITTED BY AN OBJECT

Filed Nov. 8, 1965

United States Patent Office 3,379,881
Patented Apr. 23, 1968

1

3,379,881
DEVICE FOR THE REPRESENTATION IN DIFFERENT COLORS OF DIFFERENT RADIATION INTENSITIES EMITTED BY AN OBJECT

Marcel Leroy, Le Perreux-sur-Marne, France, assignor to Commissariat à l'Energie Atomique, Paris, France
Filed Nov. 8, 1965, Ser. No. 507,994
Claims priority, application France, Nov. 10, 1964, 994,554
5 Claims. (Cl. 250—71.5)

ABSTRACT OF THE DISCLOSURE

Radiation emitted by an object is represented by different colors for different ranges of intensity using a radiation detector to a source of scintillations providing a luminous image on a screen with filters of different colors interposed between the source and the screen with synchronization of the scintillations to coincide with the transition of a filter as a function of the intensity of the detected radiation.

The present invention relates to a device for the representation in plan of radiation emitted by an object, whereby the levels of radiation intensity which are comprised within different predetermined ranges are represented by different colors.

The device is intended especially for the study of variations from one point to another of the infra-red radiation emitted by an object or for studying the distribution of a radioactive tracer within a phantom. One of its most interesting applications lies in the field of medical diagnostics, in which it is important to obtain a diagrammatic representation which can be interpreted without difficulty of local variations in the fixation of a radioactive tracer. A diagram of this type, or so-called cartograph, is built up by means of a scanning process.

In order to produce color cartographs, it is known to make use of devices comprising detection means for supplying a signal which is a function of the radiation detected, means for forming on a screen a luminous image whose color is a function of the range of intensity of detected radiation and means for producing in synchronism the relative displacement of the detection means with respect to the phantom and the relative displacement of the luminous image with respect to the screen.

In the devices of this type the pulses supplied by a scintillation detector are transmitted to an integrator. The pointer of a galvanometer which is responsive to the output voltage of the integrator is provided with a reflecting dial which is divided into sectors of different colors. A fixed point through which the different sectors pass during movement of the pointer is illuminated and photographed at regular intervals. Thus, the color at this point is a function of the frequency of the pulses supplied by the detector.

The devices referred-to are subject to a disadvantage in that they possess high inertia in the transition from one color to another, the time required for this transition being frequently on the order of several seconds, particularly if the transition takes place between two colors located respectively at each end of the reflecting dial. The color-changing system consequently introduces into these devices a time constant which limits the number of measurements per unit area which can be taken without unnecessarily increasing the phantom-scanning time of the detector.

The present invention makes it possible to reduce the scanning time to values on the order of one millisecond or even one microsecond, depending on the number of

2 statistical events which occur in contemplated use of the invention. The invention thus achieves higher fidelity in cartograph recording and more accurate localization of observed pathological anomalies.

This invention has for its object a device for the representation in plan of radiation emitted by an object, whereby the levels of radiation intensity within different predetermined ranges are represented by different colors, and comprising detection means for delivering a signal which is a function of the radiation detected, means for forming on a screen a luminous image whose color is a function of the range of intensity of the detected radiation, means for producing in synchronism on the relative displacement of the detection means with respect to the object and the relative displacement of the luminous image with respect to the screen, wherein said device further comprising a source of scintillations which form said image, a disc carrying a plurality of filters of different colors which are interposed successively, during the rotation of said disc, in the path of the light rays between said source and said image, means for driving the disc in rotation at a substantially constant speed, and synchronization means for causing the emission of a light flash or scintillation to coincide with the transition between the source and the image of one of the filters as a function of the intensity of detected radiation by selection means controlled by the detection means.

According to a preferred embodiment of the invention, the selection means comprise a plurality of photoelectric cells arranged in similar manner to the filters on the disc, a circuit for selectively energizing one of the photoelectric cells as a function of the intensity of detected radiation and means synchronized with the disc whereby the photoelectric cells are swept by a light beam, the emission of the light flash being produced as a result of the coincidence of the application of voltage to a photoelectric cell with the sweeping of the photoelectric cell by the light beam.

The selection of the photoelectric cell which is energized can be effected, for example, by a measuring instrument such as a galvanometer which is responsive to a direct-current voltage supplied by the detection means. In this case, the time constant introduced by the color-changing system can be reduced by the present invention to values of a few milliseconds or a few tens of milliseconds and the disc which carries the colored filters can be rotated at a sufficiently high speed (1500 to 3000 r.p.m., for example) so that it introduces practically no delay. These values are to be compared with the time constants of a several seconds of the color-cartograph devices of the prior art.

In other embodiments of the present invention, the selection of colors can be made directly by a counter as a function of the frequency of pulses supplied by a suitable detector. The time constant of the color change can in that case be reduced to a few microseconds.

In accordance with an additional advantage of the present invention, it is possible to vary the ranges of the radiation intensities to which different colors are assigned and to make use of non-linear laws in order to increase the contrasts in a field of intensities which is of particular interest. With this object in mind, the order of the colors can also be modified both rapidly and easily and certain colors can be eliminated by changing the filters or replacing them with opaque screens.

In order that the characteristic features and essential advantages of the device according to the invention may become more readily apparent, there follows below a description of particular embodiments which are chosen by way of non-limitative example, reference being made therein to FIGS. 1 to 3 of the accompanying drawings, in which.

Figure 2:
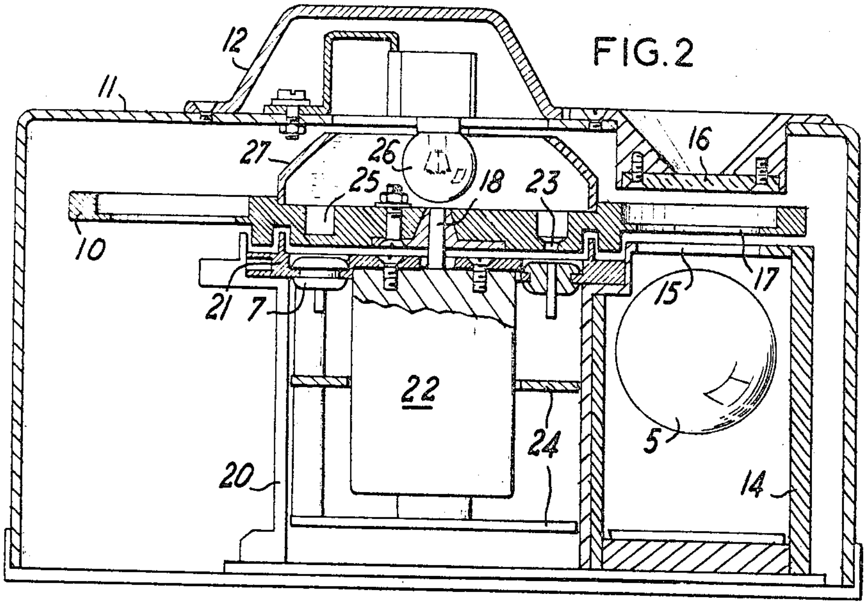
FIG. 2 illustrates the system of selection of colors employed.

The device which is described hereinafter is employed especially for the preparation of cartographs which are characteristic of the variations in concentration of a radioactive tracer in a phantom. The detector 1 is a scintillator consisting, for example, of a thallium-activated sodium iodide crystal and associated with a photomultiplier. The frequency of the pulses delivered by said detector is a function of the intensity of $\gamma$-radiation applied thereto.

The detector 1 is mounted on an apparatus to which two perpendicular movements of translation are imparted so as to sweep the surface to be scanned to a full extent and at a uniform speed. The pulses are transmitted to an integrator 2 and this latter supplies a direct-current voltage which is proportional to the number of pulses received. When said voltage reaches a predetermined value, the integrator 2 produces through the intermediary of a synchronization system 3 which will be referred-to again later and a control unit 4, the emission of a light flash from a stroboscopic lamp 5.

The integrator 2 also controls the color-selecting device 6 by energizing either one or the other of the photodiodes 7 depending on the range in which the frequency of the pulses applied thereto is located. Thus, as will be described later, the current which passes through the energized photodiode 7 when this photodiode is subjected to the action of a light beam is employed in the synchronization system 3, after amplification in the amplifier 8, to cause the emission of the light flash to coincide with the transition in front of the stroboscopic lamp 5 of a predetermined colored filter.

An optical device, not shown in the drawings, forms an image of the flash thus colored and this image is in turn produced on a suitable photographic film. A mechanism, also omitted from the drawings, produces the relative displacement of the image and of the film so as to sweep the film in synchronism with the sweeping of the surface which is scanned by the detector 1.

There is associated with each photodiode 7 a different predetermined filter, the color of the filter being so chosen as to distinguish the pulse frequency range corresponding to said photodiode.

In accordance with the invention, the different colored filters are carried by a disc which is driven in rotation at high speed (1500 to 3000 r.p.m.) so as to cause each filter to pass successively in front of the stroboscopic lamp. Said disc 10, the photodiodes 7 and the stroboscopic lamp 5 are contained in a case 11 (as shown in FIG. 2) which is closed by a light-proof cover 12. Inside said case 11, the stroboscopic lamp 5 is placed within a chamber 14 provided with a top window 15. Above said window, the case 11 is provided with an opening which is closed by a ground Plexiglas plate 16. The optical camera system is focussed on plate 16. The function of plate 16 is to provide uniform luminosity of the images obtained.

The colored filters, such as the filter 17, move into position between the window 15 and the plate 16, and are uniformly spaced over the disc 10 about the spindle 18.

The case 11 contains, below lamp 26, a cylindrical support 20 on which a plate 21 rests and supports the disc-driving motor 22, the photodiodes 7 and the printed circuits 24. The photodiodes 7, equal in number to the filters 17, are uniformly space around the motor 22 at a same distance from the spindle 18.

The disc 10 is provided with an aperture 23 which, during the rotation of the disc, moves in turn into position above each photodiode 7. A cavity 25 is drilled in the disc 10 at a point which is symmetrical with the aperture 23 with respect to the spindle 18 so as to balance the disc. The continuous light emitted by a bulb 26 is directed by a reflector 27 onto the top surface of the disc 10. The light thus illuminates the aperture 23 irrespective of the angular position thereof, with the result that the photoelectric cells are continuously swept by a light beam in synchronism with the rotation of the disc 10. The photoelectric cells which are not illuminated by the light beam are dark. The shape of the opposite faces of the disc 10 and the plate 21 prevents passage of light.

The current supplied through a photodiode 7 to which voltage is applied when the light beam impinges thereon makes it possible to detect the passage in front of the stroboscopic lamp 5 of a predetermined filter 17 depending solely on the position of said photodiode.

The selecting device 6 which controls the photodiodes may be a galvanometer which is responsive to the output voltage of the integrator 2 and in which the dial is replaced by contacts over which a friction-contact brush moves, the brush being a part of the instrument pointer. The contacts each supply a photodiode 7. The relative dimensions of the contacts therefore determine the distribution of colors according to the intensity of detected radiation. As a general rule, this distribution is linear, the intervals of intensity covered by the different contacts being equal. However, other types of dials carrying contacts of different dimensions can also be employed in order to emphasize variations in radiation intensity within particular ranges of activity.

Figure 1:
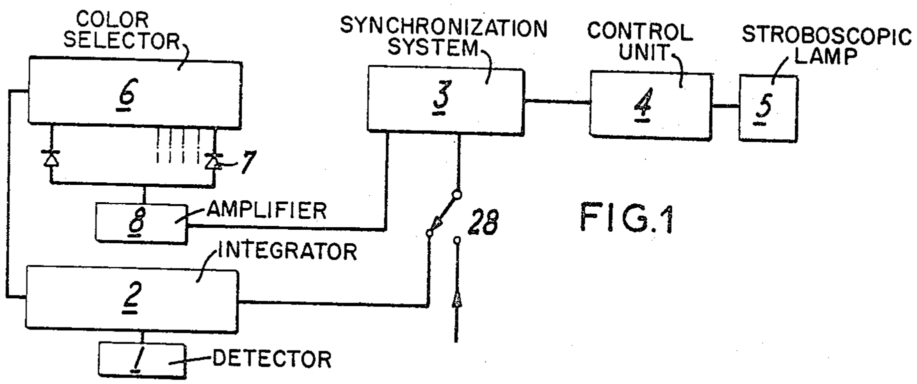
FIG. 1 is a general arrangement diagram of the device according to the invention.

With the device as described in FIG. 1, the operation of the stroboscopic lamp 5 is effected from the integrator 2 through the intermediary of the synchronization system 3. In this case, the time interval which elapses between two successive flashes can be inversely proportional to the intensity of detected radiation at each point. Thus, the variations in said intensity can be represented by differences in the concentration of colored spots and at the same time by differences in color. The practical advantage of this arrangement is that it provides simultaneous recording of a monochrome cartograph on paper either by impression or by burning.

However, the stroboscopic lamp can also be controlled by a time base by means of a change-over switch 28 so that the light flashes or scintillations are produced at a uniform frequency. Since the scanned surface is usually swept at a uniform rate, the cartograph which is obtained appears in the form of uniformly spaced colored spots.

Figure 3:
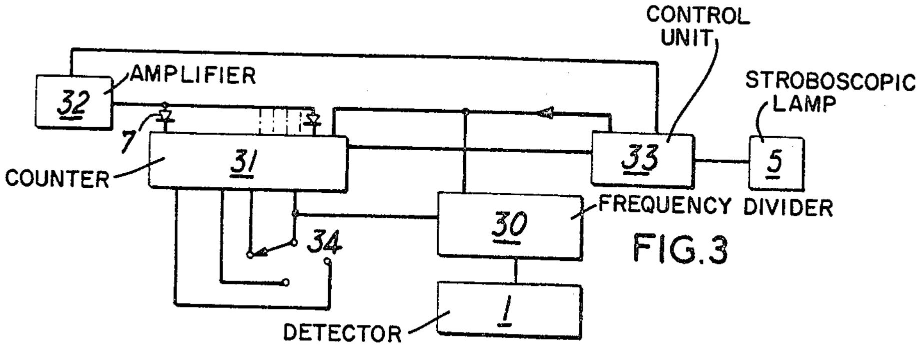
FIG. 3 illustrates another embodiment of the device.

The embodiment of the invention as illustrated in FIG. 3 also makes use of the assembly which is shown in FIG. 2, including the disc 10 which carries the colored filters 17, the photodiodes 7 and the stroboscopic lamp 5. This embodiment differs from the preceding in that the selection of the photodiode to which voltage is applied is effected by a counter in direct dependence on the frequency of the pulses delivered by the detector 1.

The detector 1 is associated with a frequency divider 30, the division law of which can be varied so as to regulate the sensitivity of the color-changing device. The pulses derived from said frequency divider 30 are transmitted to a suitably decoded counter 31 which may be a ring counter.

In the same manner as in the first embodiment herein described, the current supplied through the photodiode 7 to which voltage is applied, when the light beam directed through the aperture 23 falls thereon, is amplified by the amplifier 32, then transmitted to the system 33 for controlling the stroboscopic lamp 5 so as to synchronize the light flash with the transition of the filter associated with the photodiode in front of the lamp 5. In this embodiment also, the frequency of light flashes can be either uniform or dependent on the pulse count rate.

Finally, a change-over switch 34 varies the law of distribution of radiation intensities in ranges with which different colors are associated.

In particular, in order to indicate vacancies in radioactive tracer fixation, a division of intensities can be adopted according to a geometric progression. A variation in inverse ratio to this geometric progression eliminates or attenuates background and low count rates.

The embodiment of FIG. 3 records on the photographic film a large amount of data per unit area, the color-change time constants being reduced to values on the order of a few microseconds.

What I claim is:

1. Device for the representation in plan of radiation emitted by an object, whereby the levels of radiation intensity within different predetermined ranges are represented by different colors, comprising detection means delivering a signal which is a function of the radiation detected, a scintillation source forming a luminous image on a screen, means for producing in synchronism the relative displacement of said detection means with respect to said object and, the relative displacement of said luminous image with respect to said screen, a disc carrying a plurality of filters of different colors, said filters being interposed successively during the rotation of said disc in the path of the light rays between said source and said image, means for driving said disc in rotation at a substantially constant speed and synchronization means for causing the emission of a light flash to coincide with the transition between said source and said image of one of said filters as a function of the intensity of detected radiation by selection means controlled by said detection means.

2. Device in accordance with claim 1, wherein said selection means comprise a plurality of photoelectric cells arranged in similar manner to the filters on the disc, a circuit for selectively applying voltage to one of the photoelectric cells as a function of the intensity of detected radiation and means which are synchronized with the disc whereby the photoelectric cells are swept by a light beam, the emission of the light flash being produced as a result of the coincidence of the application of voltage to a photoelectric cell with the sweeping of said cell by the light beam.

3. Device in accordance with claim 2, wherein said sweeping means comprise a member which is integral with the disc for successively reflecting onto each photoelectric cell, during the rotation of the disc, the light emitted by a stationary source.

4. Device in accordance with claim 1, wherein the detection means comprise a scintillation detector and an integrator for the integration of pulses supplied by the detector which controls the scintillation source through the intermediary of the synchronization means.

5. Device in accordance with claim 1, wherein the detection means comprise a scintillation detector and a counting system which controls the application of voltage to a photoelectric cell which is selected in dependence on the count rate.

No references cited.

RALPH G. NILSON, *Primary Examiner.*

M. J. FROME, *Assistant Examiner.*